(12) United States Patent
Quatrano (10) Patent No.: US 11,014,608 B2
(45) Date of Patent: May 25, 2021

(54) VEHICLE SUSPENSION ADJUSTMENT

(71) Applicant: Ford Global Technologies, LLC, Dearborn, MI (US)

(72) Inventor: Nicholas Anthony Quatrano, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 85 days.

(21) Appl. No.: 16/378,346

(22) Filed: Apr. 8, 2019

(65) Prior Publication Data
US 2020/0317269 A1 Oct. 8, 2020

(51) Int. Cl.
*B62D 17/00* (2006.01)

(52) U.S. Cl.
CPC .................... *B62D 17/00* (2013.01)

(58) Field of Classification Search
CPC ............ B62D 17/00; B60G 2200/46; B60G 2400/05142; B60G 2204/4193
USPC .................................................. 280/86.757
See application file for complete search history.

(56) References Cited

U.S. PATENT DOCUMENTS

| | | | |
|---|---|---|---|
| 4,726,603 A | 2/1988 | Sugiyama et al. | |
| 4,835,714 A | 5/1989 | Sano et al. | |
| 7,370,552 B2 * | 5/2008 | Yun ........................ | B62D 7/146 |
| | | | 74/484 R |
| 7,914,020 B2 | 3/2011 | Boston | |
| 8,424,880 B2 | 4/2013 | Horiguchi et al. | |
| 9,216,625 B2 * | 12/2015 | Ramirez Ruiz .... | B60G 17/0162 |
| 10,112,649 B2 | 10/2018 | Rogers | |
| 2020/0062063 A1 * | 2/2020 | Quatrano ........... | B60G 17/0163 |
| 2021/0053622 A1 * | 2/2021 | Quatrano .............. | B60G 7/006 |

FOREIGN PATENT DOCUMENTS

| | | | | |
|---|---|---|---|---|
| EP | 0378028 A1 * | 7/1990 | ......... | B60G 17/0152 |
| EP | 1799472 B1 | 5/2011 | | |
| JP | 6439112 U | 3/1989 | | |
| JP | 2008137438 A | 6/2008 | | |
| JP | 2009132377 A | 6/2009 | | |
| JP | 5387335 B2 | 1/2014 | | |

* cited by examiner

*Primary Examiner* — Laura Freedman
(74) *Attorney, Agent, or Firm* — Raymond L. Coppiellie; Bejin Bieneman PLC (57) ABSTRACT

An assembly includes a suspension link, a worm screw, a worm wheel rotatably engaged with the worm screw, and an arm fixed to the worm wheel and connected to the suspension link.

18 Claims, 9 Drawing Sheets

VEHICLE SUSPENSION ADJUSTMENT

BACKGROUND

Vehicles include components that are typically positioned for conventional driving along a roadway. For example, a tire can be aligned with the roadway such that a surface of the tire substantially evenly contacts the roadway. To adjust the components to operate the vehicle in a different manner, e.g., to adjust the alignment of the tire to improve handling during a turn, can be difficult, e.g., can require disassembly of one or more vehicle components.

DETAILED DESCRIPTION

An assembly includes a suspension link, a worm screw, a worm wheel rotatably engaged with the worm screw, and an arm fixed to the worm wheel and connected to the suspension link.

The assembly may further include a motor, wherein the worm screw may be mounted to the motor.

The worm screw may be rotatable to a specified rotation angle corresponding to a specified camber angle.

The assembly may further include a pin extending from the arm to the suspension link.

The arm may define a slot, and the pin may be movable within the slot.

The pin may be movable from a first position in the slot, the first position defining a first suspension link position, to a second position in the slot, the second position defining a second suspension link position.

The assembly may further include a vehicle wheel, wherein the suspension link may be connected to the vehicle wheel.

The suspension link may be movable from a first position defining a first camber angle of the vehicle wheel to a second position defining a second camber angle of the vehicle wheel.

The worm screw may be rotatable to a first rotation angle to move the suspension link to the first position to a second rotation angle to move the suspension link to the second position.

The second position may be outboard relative to the first position.

The assembly may further include a second arm and a pin extending between the arm and the second arm.

The suspension link may be supported by the pin between the arm and the second arm.

The assembly may further include a rod extending from the worm wheel to the arm.

The assembly may further include a computer programmed to receive user input specifying an operation mode of a vehicle, the operation mode associated with a specified camber angle, and to rotate the worm wheel to move the suspension link to provide the specified camber angle.

A system includes a computer including a processor and a memory, the memory storing instructions executable by the processor to receive user input specifying an operation mode of a vehicle, the operation mode associated with a specified camber angle of a vehicle wheel and to rotate an arm connected to a suspension link to provide the specified camber angle.

The instructions may further include instructions to actuate a motor to rotate the arm to move the suspension link.

The arm is fixed to a worm wheel, and the instructions may further include instructions to rotate the worm wheel to move the suspension link.

The system may further include a worm screw rotatably engaged with the worm wheel, wherein the instructions may further include instructions to rotate the worm screw to a specified rotation angle corresponding to the specified camber angle.

The instructions may further include instructions to move the suspension link from a first position defining a first camber angle of the vehicle wheel to a second position defining a second camber angle of the vehicle wheel.

The instructions may further include instructions to rotate the arm from a first position corresponding to the first position of the suspension link to a second position corresponding to the second position of the suspension link.

Further disclosed is a computing device programmed to execute any of the above instructions. Yet further disclosed is a vehicle comprising the computing device. Yet further disclosed is a computer program product, comprising a computer readable medium storing instructions executable by a computer processor, to execute any of the above method steps.

Changing the suspension angle of a wheel, such as a camber angle, a castor angle, or a toe angle, adjusts contact of a tire with a roadway, which can improve handling of a vehicle in a turn while increasing wear on the tire from uneven distribution of a surface of the tire on the roadway. Determining a camber angle for the wheel can require selection from competing design choices, weighing improved handling at the cost of increased wear on the tire. Manually changing the camber angle can be time-consuming and difficult, requiring disassembly of a wheel assembly and adjustment of a suspension link, or installation of additional components (e.g., adjustable suspension links) for each adjustment to the camber angle. The suspension links may be costly and difficult to install.

A user can provide input to a computer which actuates a worm screw to change the camber angle without disassembly of the vehicle, easing adjustment of the camber angle. Adjusting the camber angle with the computer reduces overall wear on the tire by returning the camber angle to a position designed for conventional roadway use may evenly distribute the surface of the tire on the roadway when the improved handling is no longer required. The computer can actuate the motor to rotate the leadscrew. Rotating the worm screw moves a suspension link, changing the camber angle. The user can adjust the camber angle of the wheel by providing input to the computer rather than manually adjusting the camber angle with, e.g., a manually adjustable mount. The worm screw that moves the suspension link to provide the camber angle allows the user to adjust the camber angle based on a preferred operation mode, e.g., an operation mode corresponding to vehicle operation on a track, an operation mode corresponding to conventional vehicle operation on a roadway, etc.

The user can provide input regarding an operation mode of the vehicle to the computer. The operation mode can include settings for vehicle components, e.g., traction control, stability control, throttle response, shock absorber damping, etc. Each operation mode adjusts the components for a particular type of driving, e.g., conventional roadway driving, racetrack driving, fuel-saving driving, etc. The computer can associate a camber angle with each operation mode based on the type of driving associated with the operation mode. Upon receiving the input for the operation mode, the computer can actuate the worm screw to move the suspension link to provide the camber angle associated with the operation mode.

Figure 1:
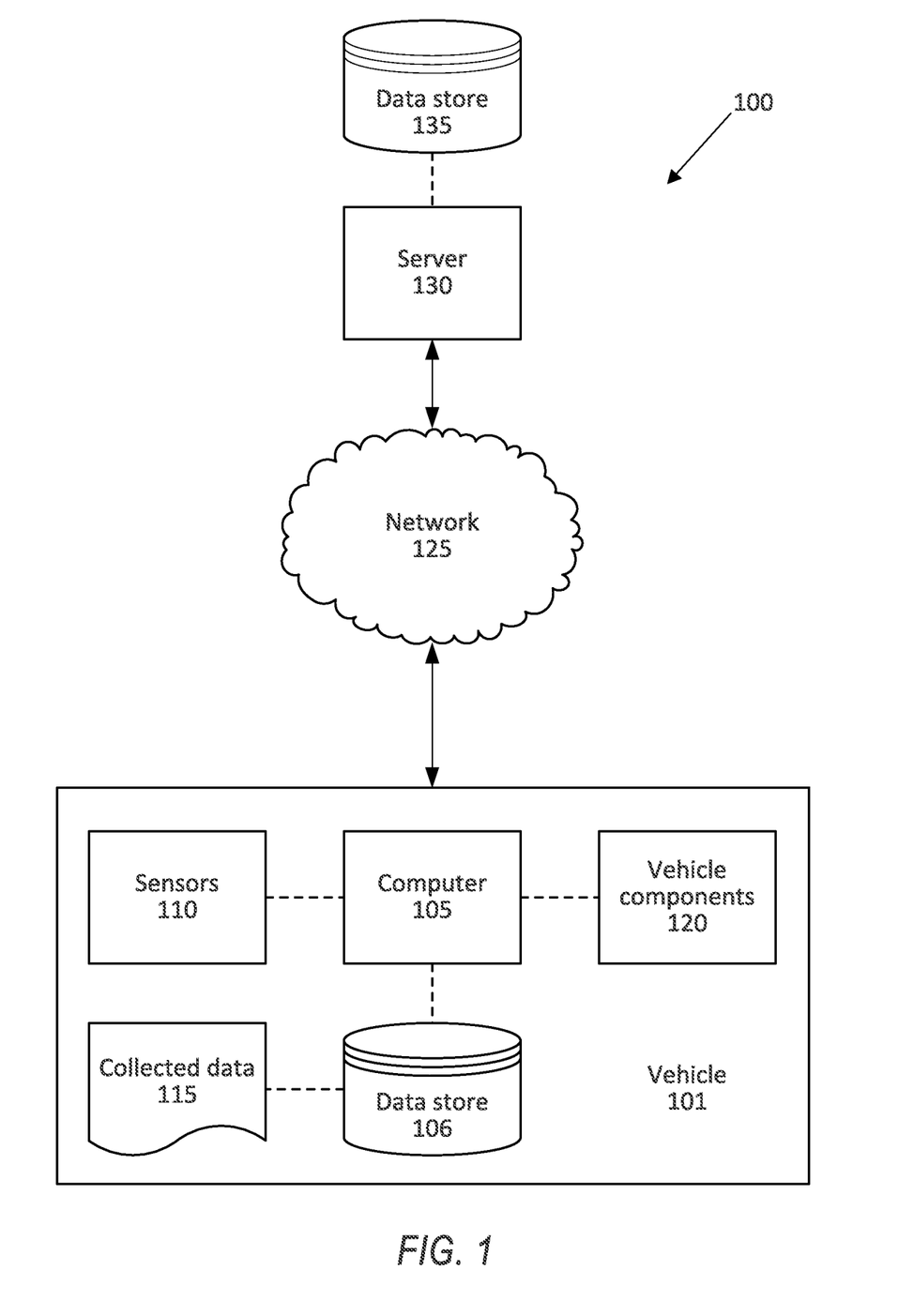
FIG. 1 is a block diagram of a system for adjusting a vehicle wheel camber angle.

FIG. 1 illustrates an example system 100 for adjusting a camber angle of a wheel in a vehicle 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 includes multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 may include cameras, motion detectors, etc., i.e., sensors 110 to provide data 115 for evaluating a position of a component, evaluating a slope of a roadway, etc. The sensors 110 may, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, or the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can include a network 125 connected to a server 130 and a data store 135. The computer 105 can be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

With reference to the Figures, wherein like numerals indicate like parts throughout the several views, an assembly 200 in a vehicle 101 includes a suspension link 205, a worm screw 210, a worm wheel 215 rotatably engaged with the worm screw 210, and an arm 220 fixed to the worm wheel 215 and connected to the suspension link 205.

Figure 2A:
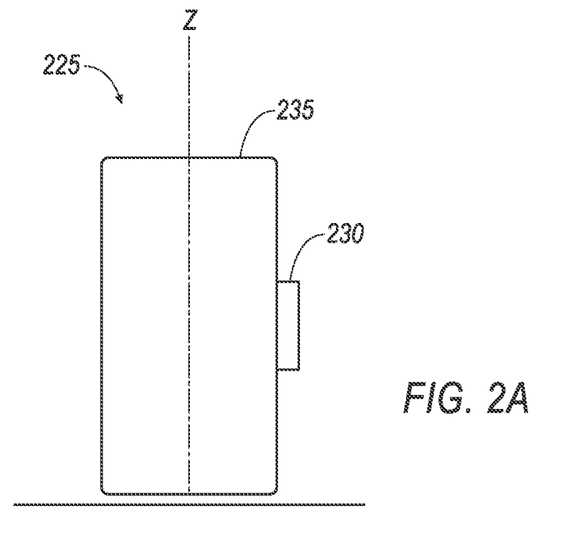
FIGS. 2A-2B are views of a wheel illustrating the camber angle.
Figure 2B:
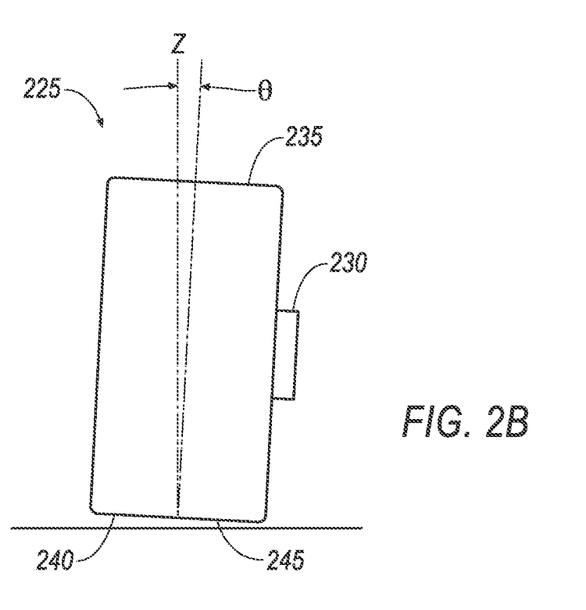

The assembly 200 includes a wheel 225, as shown in FIGS. 2A-2B. The wheel includes a hub 230 and a tire 235. As shown in FIGS. 2A-2B, the wheel defines a camber angle θ relative to a vertical axis Z. FIG. 2A shows a camber angle θ of substantially 0°, which may correspond to a "normal" operating mode, as described below. FIG. 2B shows a camber angle θ of substantially −2.5°, which can correspond to a "track" operating mode, as described below. When the camber angle θ directs the wheel 225 in an inboard direction of the vehicle 101, the camber angle θ is negative. When the camber angle θ directs the wheel 225 in an outboard direction of the vehicle 101, the camber angle θ is positive. When the camber angle θ is near zero, e.g., as shown in FIG. 2A, substantially all of an outer surface of the tire 235 contacts the roadway, evenly distributing contact along the outer surface. When the absolute value of the camber angle θ is greater than 0, e.g., as shown in FIG. 2B, portions of the tire 235 may have more contact with the roadway than other portions, which can improve operation of the vehicle 101 in a turn. For example, as shown in FIG. 2B, an outward portion 240 of the tire 235 may have decreased contact with the roadway and an inward portion 245 of the tire 235 may have increased contact with the roadway, improving turning of the vehicle 101.

Figure 3:
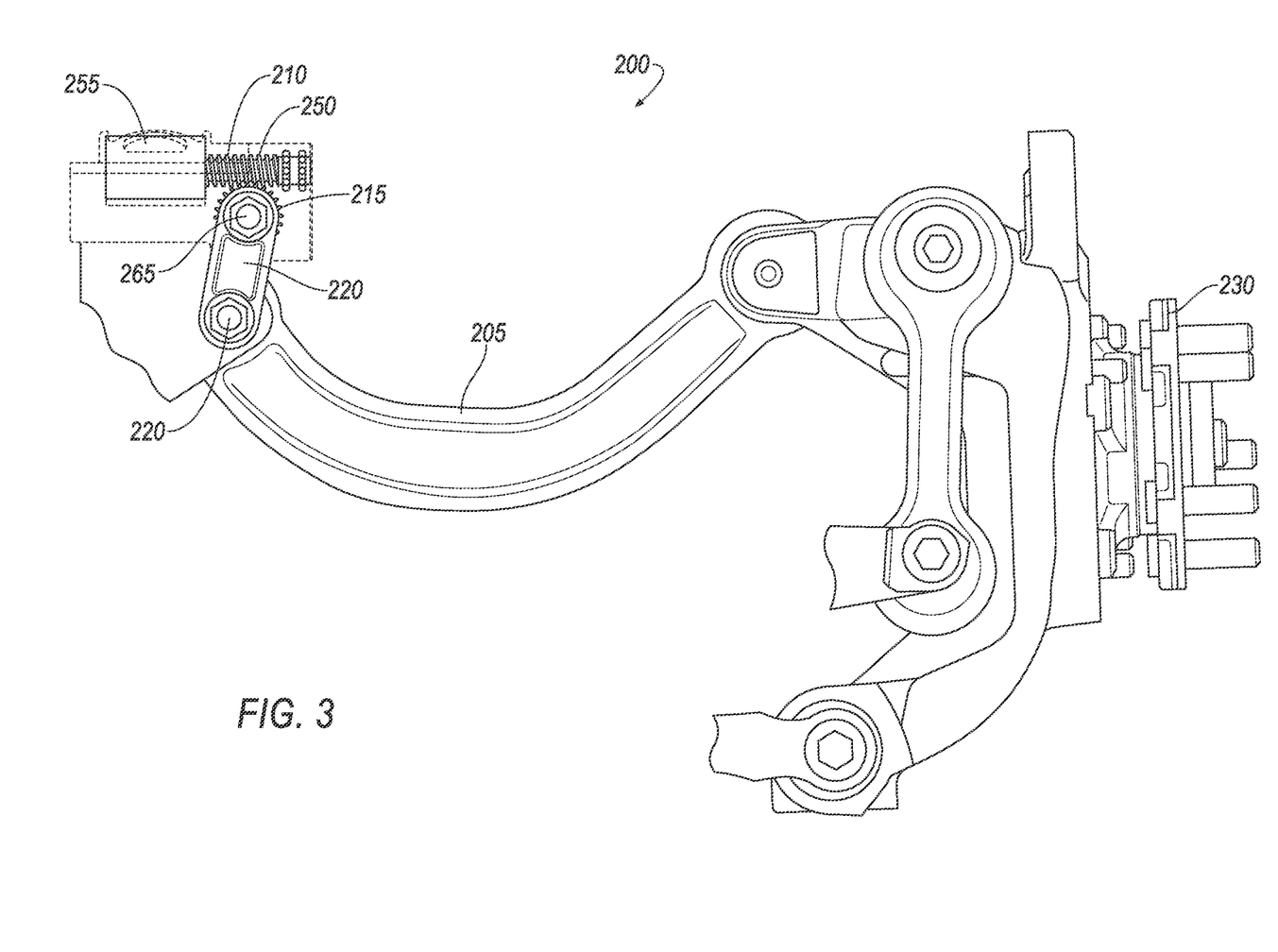
FIG. 3 is a side view of an assembly to adjust the camber angle.
Figure 5:
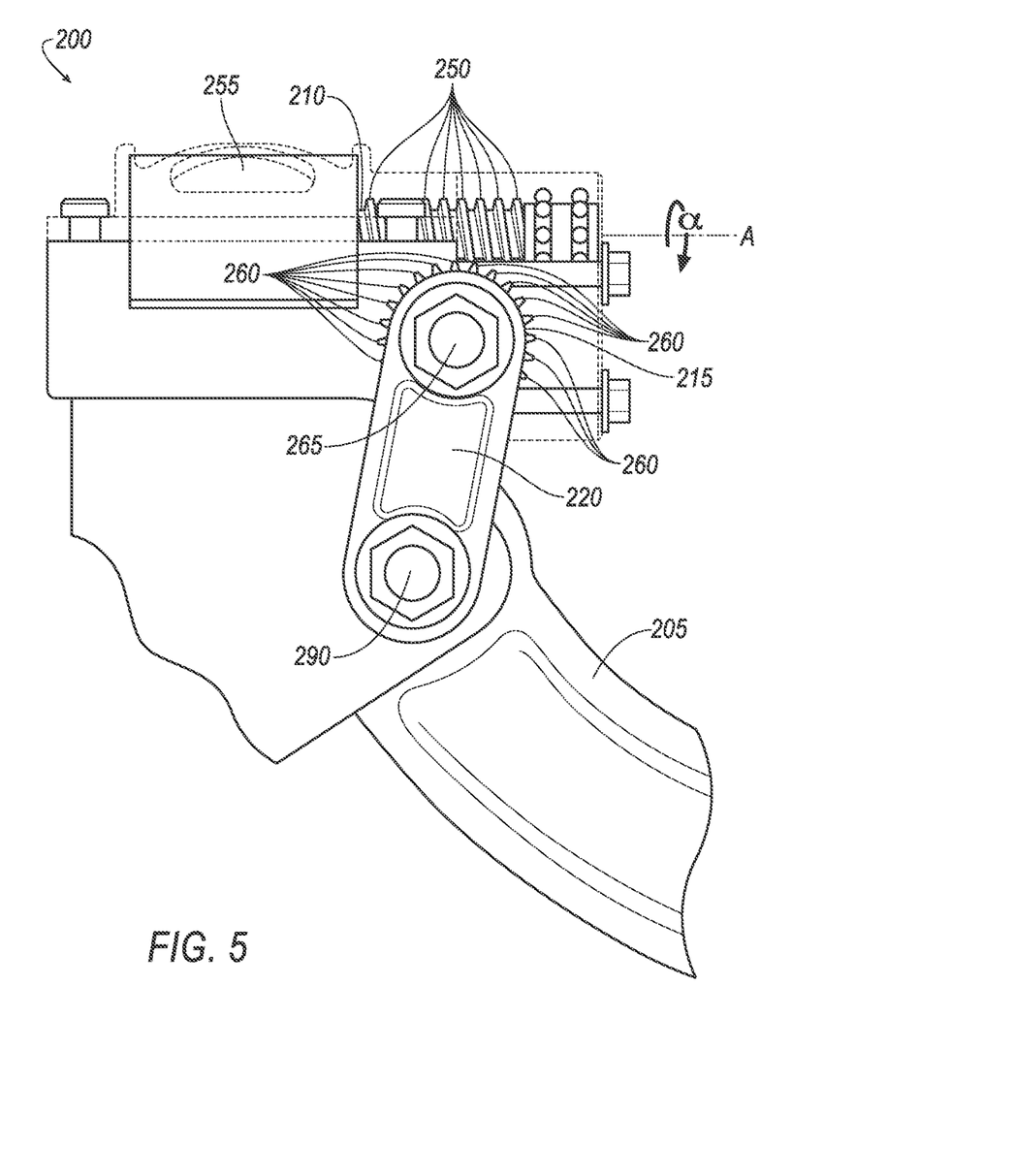
FIG. 5 is a magnified side view of the assembly.

The assembly 200 includes the suspension link 205, as shown in FIGS. 3, 5. The suspension link 205 is connected to the wheel 225. The suspension link 205 moves the wheel 225 to a specified suspension angle, e.g., a camber angle θ. That is, the suspension link 205 is movable in an outboard direction, and the outboard movement of the suspension link 205, shown as a camber link 205 in FIGS. 3, 5, moves the hub 230 of the wheel 225, moving the wheel 225 to the camber angle θ. The camber link 205 is moveable from a first position to a second position. In the first position, the camber link defines a first camber angle θ of the wheel 225. In the second position, the camber link defines a second camber angle θ of the wheel 225. The second position may be outboard relative to the first position, and thus the second camber angle θ may be greater than the first camber angle θ.

As described above and used in the examples shown in the Figures, the suspension link 205 is as a camber link 205 that adjusts a camber angle θ of the wheel 225. Alternatively, not shown in the Figures, the suspension link 205 may be a castor link that adjusts a castor angle of the wheel 225, i.e., an angle between a suspension connected to the wheel 225 and a vertical axis having an origin at the center of the wheel 225. Yet alternatively, not shown in the Figures, the suspension link may be a toe link that adjusts a toe angle of the wheel 225, i.e., an angle between the wheel 225 and a longitudinal axis of the vehicle 101.

The assembly 200 includes the worm screw 210. The worm screw 210 includes a plurality of threads 250. The worm screw 210 moves the camber link 205 to provide the camber angle θ. The worm screw 210 is rotatable about an axis A to a specified rotation angle α corresponding to a specified camber angle θ. That is, the worm screw 210 may be rotatable to a first rotation angle α to move the camber link 205 to the first position and to a second rotation angle α to move the camber link 205 to the second position.

Figure 4:
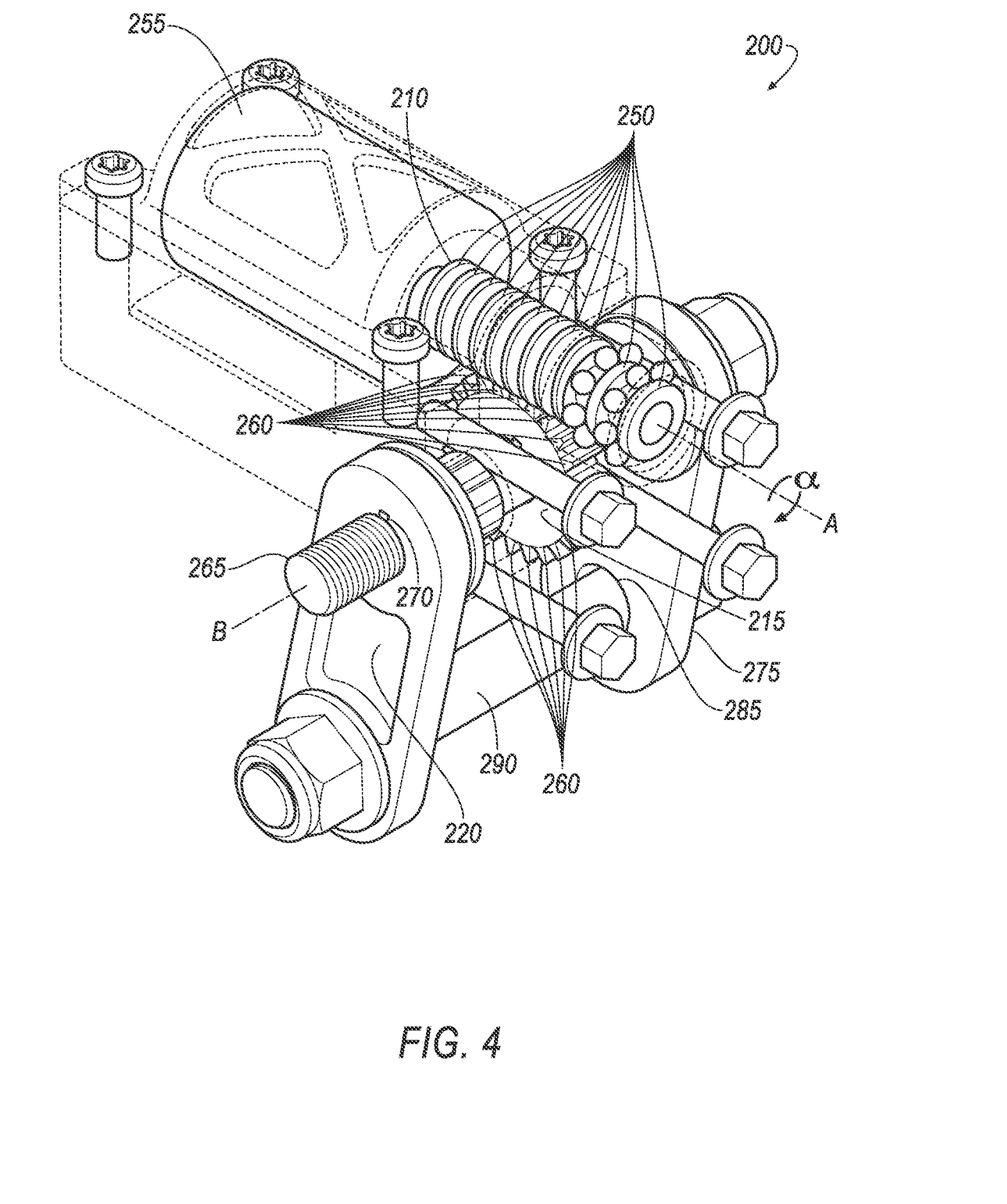
FIG. 4 is a perspective view of the assembly.

The assembly 200 includes a motor 255, as shown in FIGS. 3-6C. The motor 255 is drivably connected to the worm screw 210. For example, as shown in FIG. 4, the motor 255 may be directly mounted to the worm screw 210 along a common axis A. The motor 255 may be, e.g., a brushless DC electric motor, an AC motor, or any suitable type of motor. The computer 105 may actuate the motor 255 upon receiving input indicating a specified operation mode.

The assembly 200 includes the worm wheel 215. The worm wheel 215 is rotatably engaged with the worm screw 210. The worm wheel includes a plurality of teeth 260 that engage the threads 250 of the worm screw, as shown in FIGS. 4-6C. As the worm screw 210 rotates, the threads 250 push on the teeth 260, rotating the worm wheel 215 about an axis B perpendicular to the axis of rotation A of the worm screw 210.

The assembly 200 includes the arm 220. The arm 220 is connected to the worm wheel 215 by a rod 265 extending from the worm wheel 215 to the arm 220. The rod 265 translates rotation of the worm wheel 215 to rotation of the arm 220. For example, the arm 220 may include a securing mechanism 270 that rotatably fixes the rod to the arm. Example securing mechanisms 270 may include, e.g., Woodruff keys, bolts, locks, etc. The arm 220 moves the camber link 205 from the first position to the second position. The assembly may include a second arm 275. The arm 220 may define a slot 280, and the second arm 275 may define a second slot 285.

Figure 6A:
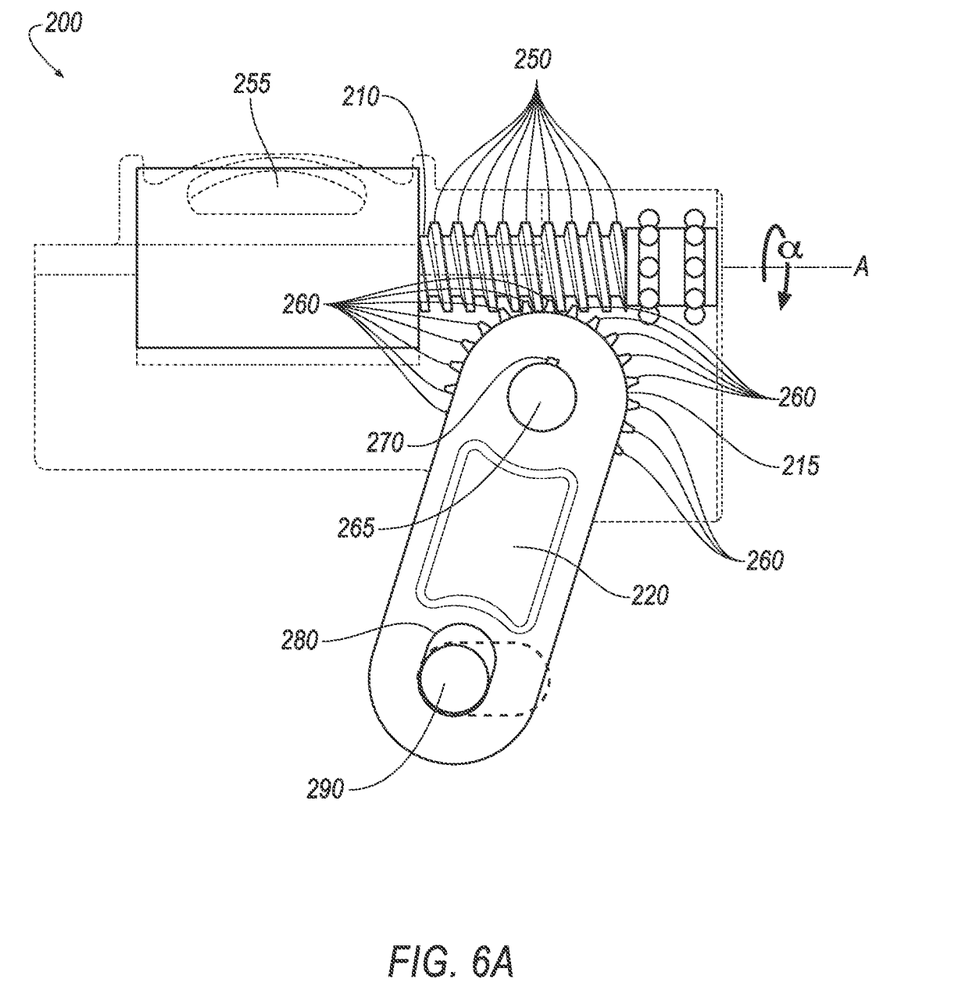
FIGS. 6A-6C are side views of a worm screw moving an arm to adjust the camber angle.
Figure 6B:
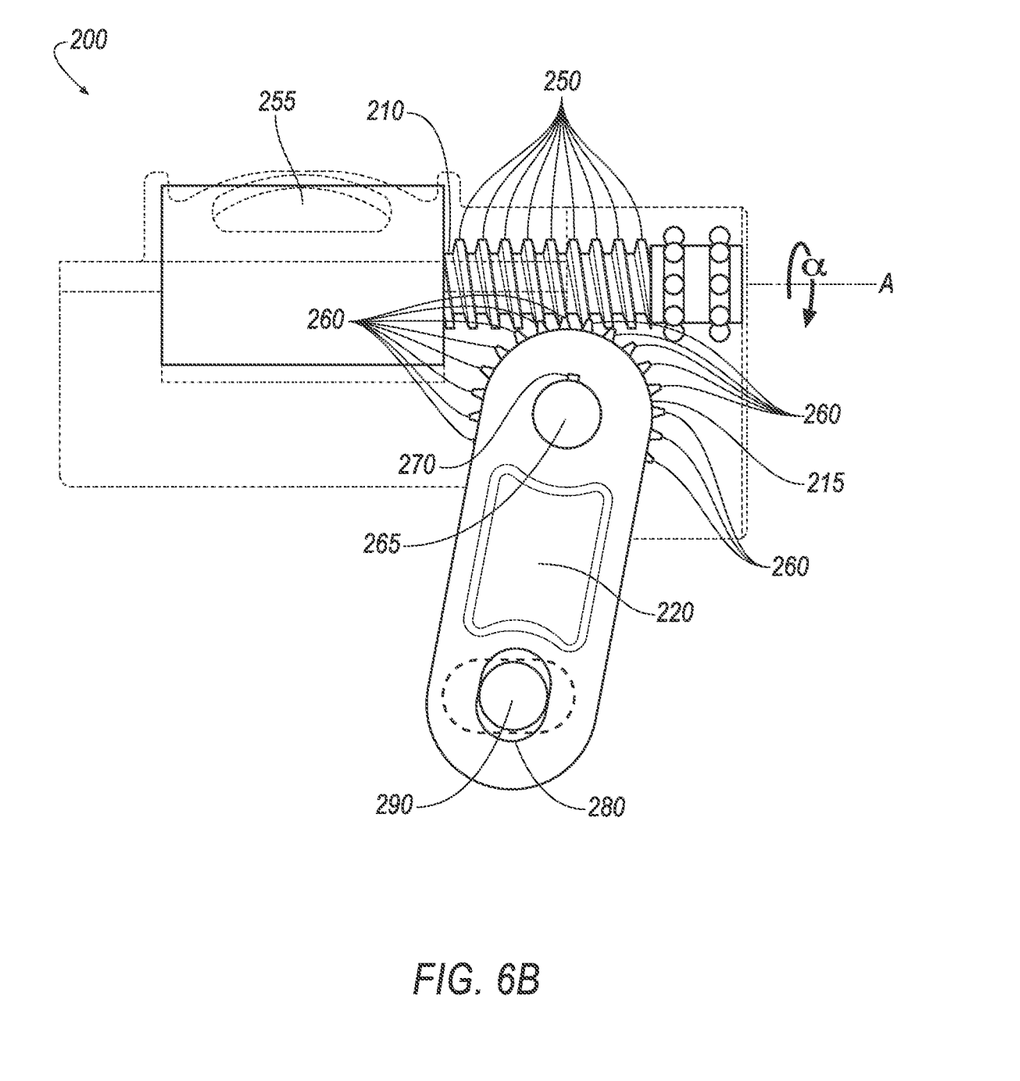
Figure 6C:
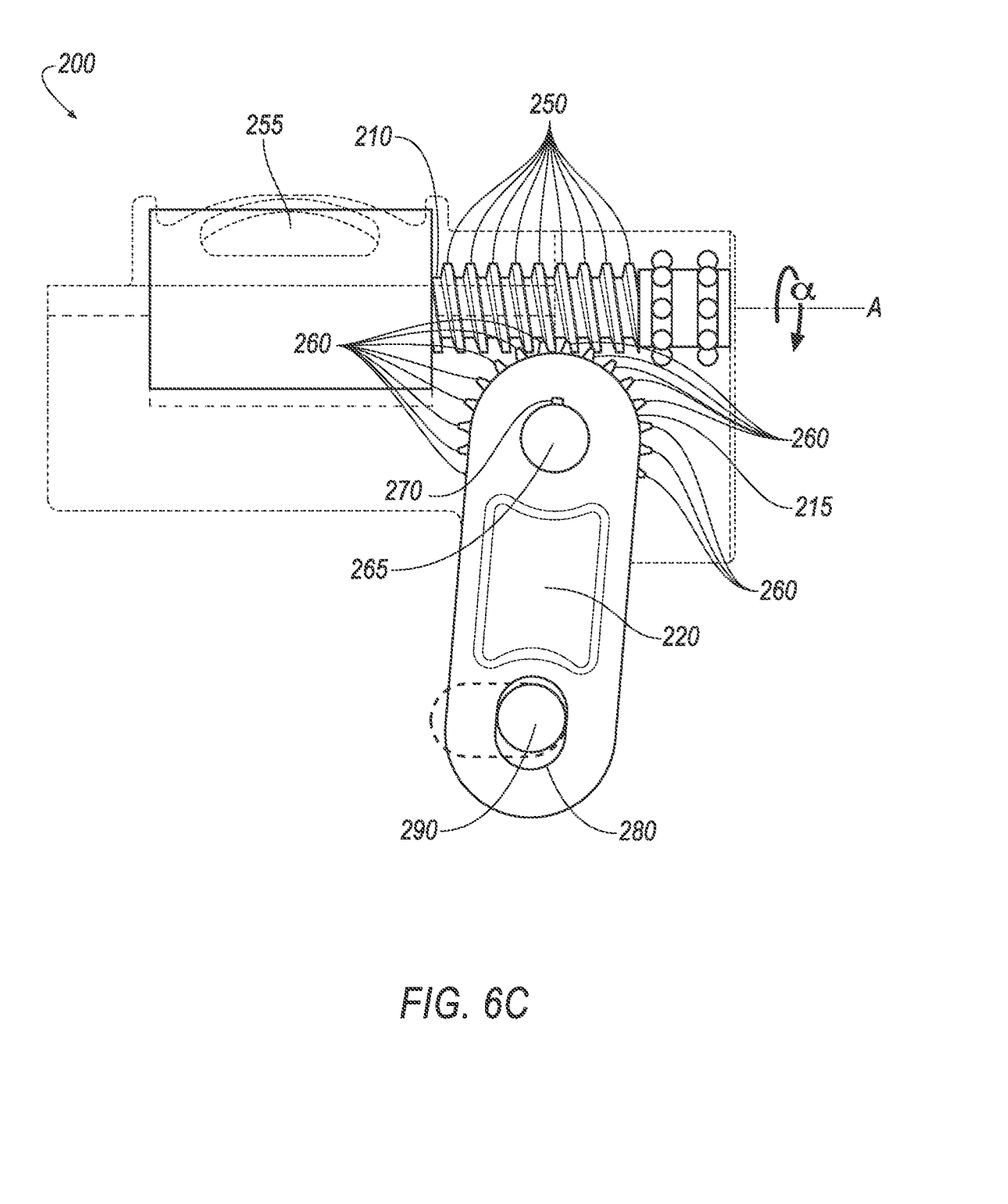

The assembly 200 may include a pin 290, as shown in FIGS. 3-6C. The pin 290 may extend from the arm 220 to the camber link 205 and to the second arm 275. That is, the camber link 205 may be supported by the pin 290 between the arm 220 and the second arm 275. The pin 290 may be disposed in the slot 280. As the arm 220 rotates, the pin 290 may move within the slot 280. As shown in FIGS. 6A-6C, the pin 290 may be movable from a first position in the slot 280 to a second position in the slot 280. For example, the first position may be the position shown in FIG. 6A, the second position may be the position shown in FIG. 6C. As the pin 290 moves from the first position to the second position, the pin 290 moves the camber link 205 from a first camber link position to a second camber link position. That is, the pin 290 may move in an outboard direction from the first position to the second position, moving the camber link 205 in the outboard direction from the first camber link position to the second camber link position. The first camber link position corresponds to a first camber angle θ, and the second camber link position camber link position corresponds to a second camber angle θ. Thus, the position of the arm in the slot corresponds to a specific camber angle θ. The pin 290 may be movable to a position between the first position and the second position, as shown in FIG. 6B, corresponding to a different camber angle θ between the first camber angle θ and the second camber angle θ.

The computer 105 can actuate the motor 255 to rotate the worm screw 210. As the worm screw 210 rotates, the threads 250 of the worm screw 210 push on the worm wheel 215, rotating the worm wheel 215. The worm wheel 215 rotates the rod 265 connected to the arm 220 and the second arm 275, rotating the arm 220 and the second arm 275. The arm 220 and the second arm 275 rotate the pin 290, and the pin 290 moves within the slots 280, 285 to move the camber link 205. The camber link 205 moves the wheel 225, defining a camber angle θ.

The computer 105 can include an operation mode stored in the data store 106. The "operation mode" is a predetermined list of settings for vehicle components 120 associated with specific types of operation of the vehicle 101. For example, the computer 105 can include a "normal" operation mode in which the settings for the vehicle components 120 are determined for conventional operation of the vehicle 101 on a roadway. In another example, the computer 105 can include a "track" operation mode in which the settings for the vehicle components 120 are determined for use on a race track. In another example, the computer 105 can include a "tow" operation mode in which the settings for the vehicle components are determined for use when towing cargo. In another example, the computer 105 can include an "eco" operation mode in which the settings for the vehicle components are determined to reduce fuel consumption.

The computer 105 receives user input specifying the operation mode. The user can provide input to a human-machine interface (HMI) (not shown), e.g., a touchscreen, a button, a lever, a rotating dial, etc. Upon receiving the user input, the computer 105 can actuate components 120 to settings associated with the operation mode, e.g., a camber angle θ, a shock absorber stiffness, a steering assist stiffness, etc.

The operation mode can be associated with a specified camber angle θ. As described above, the camber angle θ can adjust contact of the tire 235 with the roadway, affecting turning of the vehicle 101. In a "track" operation mode, the computer 105 can adjust the camber angle θ to a specified value to improve handling of the vehicle 101 turning around a corner, e.g., −1.75°, −2.5°, −3.1°, etc. In a "normal" operation mode, the computer 105 can adjust the camber angle θ to a lower value, e.g., 0°, −1°, etc., than the camber angle θ associated with the "track" operation mode to reduce wear on the tire.

When the user provides input for a specific operation mode, the computer 105 can move the wheel 225 to the camber angle θ associated with the operation mode. The computer 105 can actuate the motor 255 to rotate the worm screw 210 to a specified rotation angle α, moving the worm wheel 215, the arm 220, and the camber link 205. The specified rotation angle α corresponds to rotation of the worm wheel 215. The rod 265 transfers rotation of the worm wheel 215 to the arms 220, 275. The pin 290 transfers rotation of the arms 220, 275 to outboard movement of the camber link 205, moving the wheel to the specified camber angle θ. Thus, the computer 105 rotates the worm screw 210 to provide the camber angle θ associated with the operation mode.

The computer 105 can refer to a lookup table stored in the data store 106 and/or the server 130. For example, for a worm screw thread 250 pitch of 1.5 mm, the computer 105 can refer to Table 1 to determine the rotation angle α required for a specified camber angle θ.

TABLE 1

| Rotation Angle α (degrees) | Camber Angle θ (degrees) |
|---|---|
| 0 | −1.00 |
| 1200 | −1.50 |
| 1800 | −1.75 |
| 3600 | −2.50 |

Figure 7:
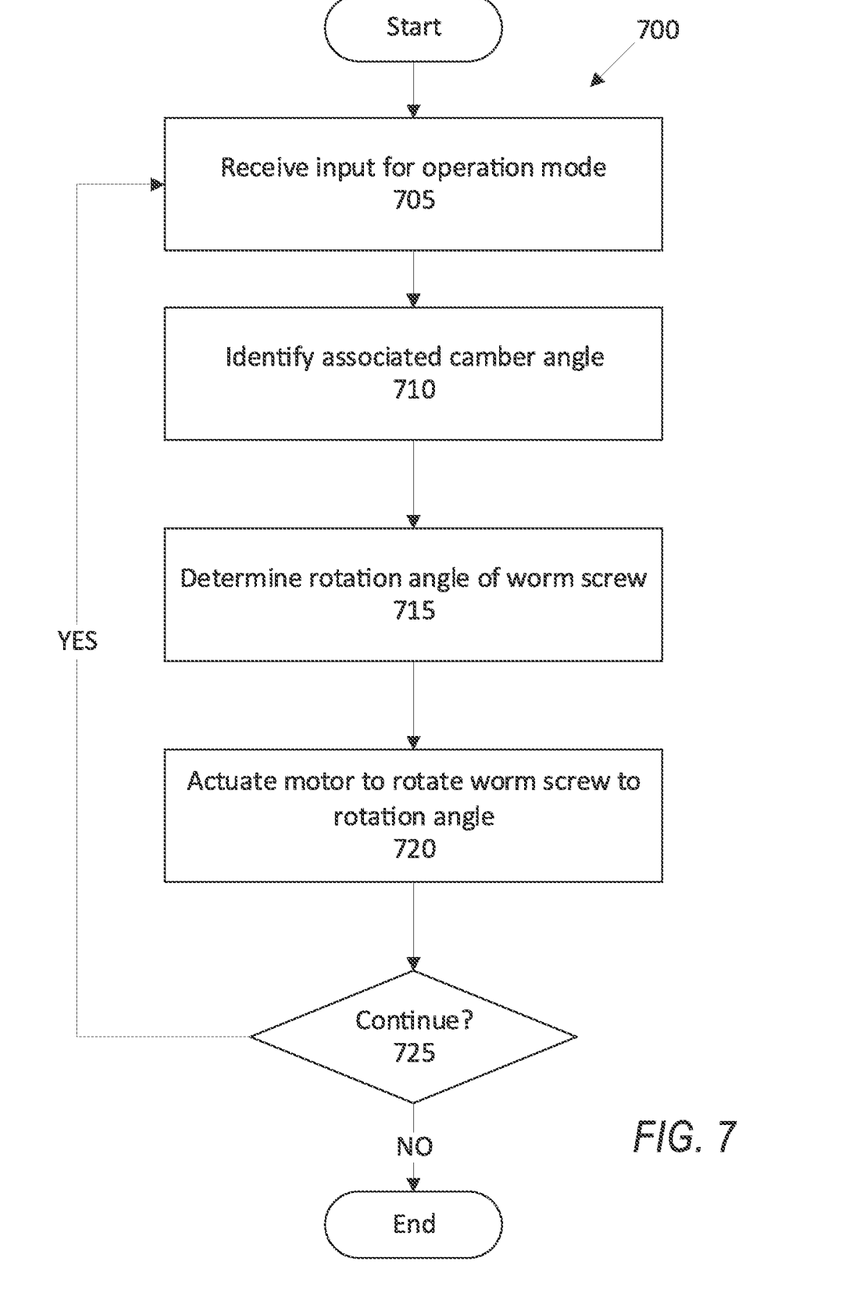
FIG. 7 is a block diagram of an example process for adjusting the camber angle.

FIG. 7 is a block diagram of a process 700 for providing a camber angle θ of a wheel 225. The process 700 begins in a block 705, in which a computer 105 receives input for a specified operation mode. The operation mode is a predetermined list of settings for vehicle components 120 associated with specific types of operation of the vehicle 101, e.g., a specified camber angle θ, a specified suspension stiffness, a specified steering assist stiffness, etc. As described above, the user can provide input to a HMI, e.g., a touchscreen, a button, a lever, etc. The input specifies one of a plurality of operation modes, e.g., a "normal" operation mode, a "track" operation mode, a "tow" operation mode, etc.

Next, in a block 710, the computer 105 determines the camber angle θ associated with the operation mode. The camber angle θ can be a predetermined value stored in the data store 106 associated with the operation mode. As described above, the camber angle θ can affect handling of the vehicle 101, and the operation mode can be associated with a specified camber angle θ to provide handling associated with the operation mode.

Next, in a block 715, the computer 105 determines a rotation angle α to which to rotate the worm screw 210 to provide the camber angle θ. As described above, the rotation angle α of the worm screw 210 corresponds to a position of the camber link 205, which corresponds to a specific camber angle θ. The computer 105 can store a lookup table in the data store 106 that provides rotation angles α corresponding to specific camber angles θ.

Next, in a block 720, the computer 105 actuates the motor 255 to rotate the worm screw 210 to the rotation angle α. Rotating the worm screw 210 to the rotation angle α rotates the worm wheel 215, which rotates the arm 220 via the rod 265. Rotation of the arm 220 moves the pin 290, and the pin 290 moves the camber link 205. Movement of the camber link 205 moves the wheel 225 to the specified camber angle θ.

Next, in a block 725, the computer 105 determines whether to continue the process 700. For example, the computer 105 can determine not to continue the process 700 when the vehicle 101 is stopped and powered off. If the computer 105 determines to continue, the process 700 returns to the block 705 to receive additional user input. Otherwise, the process 700 ends.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. For example, in the process 700, one or more of the steps may be omitted, or the steps may be executed in a different order than shown in FIG. 7. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a suspension link;
   a worm screw;
   a worm wheel rotatably engaged with the worm screw;
   an arm fixed to the worm wheel and connected to the suspension link, the arm defining an elongated slot;
   a rod extending from the worm wheel to the arm; and
   a pin extending from the arm to the suspension link and movable along the elongated slot to move the suspension link to a specified suspension link position.

2. The assembly of claim 1, further comprising a motor, wherein the worm screw is mounted to the motor.

3. The assembly of claim 1, wherein the worm screw is rotatable to a specified rotation angle corresponding to a specified camber angle.

4. The assembly of claim 1, wherein the pin is movable from a first position in the elongated slot, the first position defining a first suspension link position, to a second position in the elongated slot, the second position defining a second suspension link position.

5. The assembly of claim 1, further comprising a vehicle wheel, wherein the suspension link is connected to the vehicle wheel.

6. The assembly of claim 5, wherein the suspension link is movable from a first position defining a first camber angle of the vehicle wheel to a second position defining a second camber angle of the vehicle wheel.

7. The assembly of claim 6, wherein the worm screw is rotatable to a first rotation angle to move the suspension link to the first position to a second rotation angle to move the suspension link to the second position.

8. The assembly of claim 6, wherein the second position is outboard relative to the first position.

9. The assembly of claim 1, further comprising a second arm and the pin extends between the arm and the second arm.

10. The assembly of claim 9, wherein the suspension link is supported by the pin between the arm and the second arm.

11. The assembly of claim 1, further comprising a computer programmed to receive user input specifying an operation mode of a vehicle, the operation mode associated with a specified camber angle, and to rotate the worm wheel to move the suspension link to provide the specified camber angle.

12. The system of claim 1, wherein the pin is movable from a first end of the elongated slot to a second end of the elongated slot.

13. A system, comprising a computer including a processor and a memory, the memory storing instructions executable by the processor to:
   receive user input specifying an operation mode of a vehicle, the operation mode associated with a specified camber angle of a vehicle wheel; and
   rotate a worm wheel and a rod extending from the worm wheel to an arm, the arm fixed to the worm wheel and connected to a suspension link, to move a pin extending from the arm to the suspension link along an elongated slot of the arm to provide the specified camber angle.

14. The system of claim 13, wherein the instructions further include instructions to actuate a motor to rotate the arm to move the suspension link.

15. The system of claim 13, further comprising a worm screw rotatably engaged with the worm wheel, wherein the instructions further include instructions to rotate the worm screw to a specified rotation angle corresponding to the specified camber angle.

16. The system of claim 13, wherein the instructions further include instructions to move the suspension link from a first position defining a first camber angle of the vehicle wheel to a second position defining a second camber angle of the vehicle wheel.

17. The system of claim 16, wherein the instructions further include instructions to rotate the arm from a first position corresponding to the first position of the suspension link to a second position corresponding to the second position of the suspension link.

18. An assembly, comprising:
   a suspension link;
   a worm screw;
   a worm wheel rotatably engaged with the worm screw;
   an arm fixed to the worm wheel and connected to the suspension link, the arm defining an elongated slot;
   a second arm; and
   a pin extending from the arm to the suspension link and movable along the elongated slot to move the suspension link to a specified suspension link position, the pin extending between the arm and the second arm.

* * * * *